(12) United States Patent
Schwärzler

(10) Patent No.: US 9,457,514 B2
(45) Date of Patent: Oct. 4, 2016

(54) METHOD AND DEVICE FOR LAYERED BUILDUP OF A SHAPED ELEMENT

(71) Applicant: Klaus Schwärzler, Mammendorf (DE)

(72) Inventor: Klaus Schwärzler, Mammendorf (DE)

( * ) Notice: Subject to any disclaimer, the term of this patent is extended or adjusted under 35 U.S.C. 154(b) by 608 days.

(21) Appl. No.: 13/789,247

(22) Filed: Mar. 7, 2013

(65) Prior Publication Data

US 2013/0234369 A1    Sep. 12, 2013

(30) Foreign Application Priority Data

Mar. 8, 2012   (DE) ................. 10 2012 101 939

(51) Int. Cl.
B29C 67/00 (2006.01)
B33Y 10/00 (2015.01)
B33Y 40/00 (2015.01)

(52) U.S. Cl.
CPC ....... B29C 67/0055 (2013.01); B29C 67/0059 (2013.01); B29C 67/0081 (2013.01); B29C 67/0092 (2013.01); B29C 67/0051 (2013.01); B29C 67/0066 (2013.01); B29K 2995/0021 (2013.01); B33Y 10/00 (2014.12); B33Y 40/00 (2014.12)

(58) Field of Classification Search
None
See application file for complete search history.

(56) References Cited

U.S. PATENT DOCUMENTS

| | | | |
|---|---|---|---|
| 5,216,616 A * | 6/1993 | Masters | B29C 35/08 156/272.8 |
| 5,256,340 A | 10/1993 | Allison et al. | |
| 5,503,785 A * | 4/1996 | Crump | B29C 67/0092 264/308 |
| 5,999,184 A * | 12/1999 | Smalley | B29C 67/0092 345/419 |
| 6,423,255 B1 * | 7/2002 | Hoechsmann | B29C 67/0081 264/113 |
| 6,658,314 B1 * | 12/2003 | Gothait | B29C 67/0092 264/409 |
| 2004/0005374 A1 * | 1/2004 | Narang | B22F 3/008 425/375 |
| 2005/0200039 A1 * | 9/2005 | Nelsen | B29C 67/0055 264/40.7 |
| 2006/0158456 A1 * | 7/2006 | Zinniel | B29C 67/0059 345/589 |
| 2012/0258250 A1 * | 10/2012 | Rodgers | B29C 67/0059 427/402 |

FOREIGN PATENT DOCUMENTS

| | | |
|---|---|---|
| DE | 19853978 C1 | 5/2000 |
| EP | 0431924 | 6/1991 |
| EP | 1391289 B1 | 1/2006 |
| WO | WO01/26023 | 4/2001 |
| WO | WO2005/107981 | 11/2005 |

* cited by examiner

*Primary Examiner* — Jeffrey Wollschlager
(74) *Attorney, Agent, or Firm* — Head, Johnson & Kachigian, P.C.

(57) ABSTRACT

Since concrete materials do not cure quick enough when prototyping methods are used, so that a lower layer (2*a*) is already completely cured when the next layer (2*b*) is applied, a support material (4) is applied about the formed element (100) that is being built up in order to compensate for the lack of pressure resistance of the lower layer (2*a*), wherein the support material preferably has the same specific weight as the material (3) of the formed element (100). Thus, 3D-printing as well as selective curing are facilitated as build up methods.

6 Claims, 6 Drawing Sheets

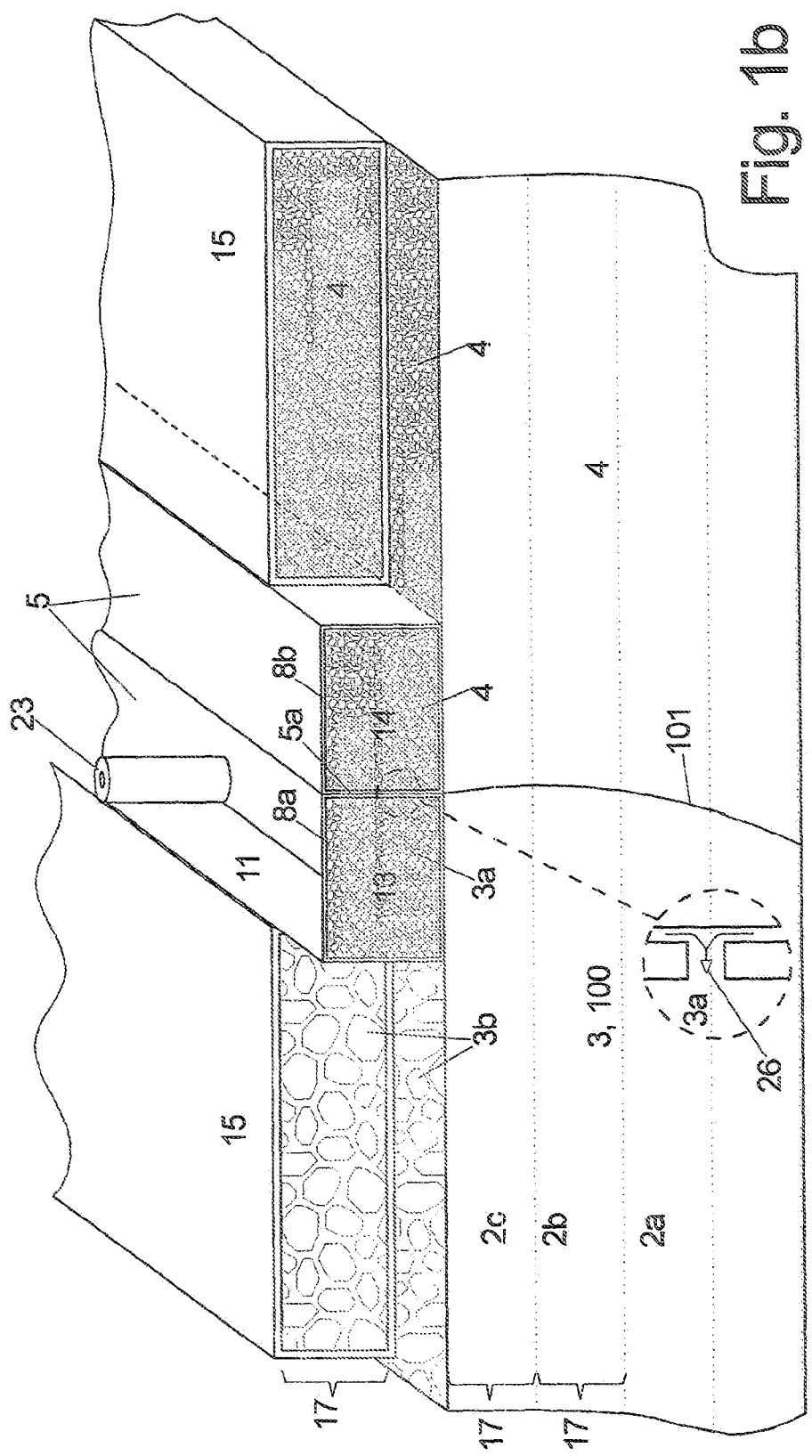

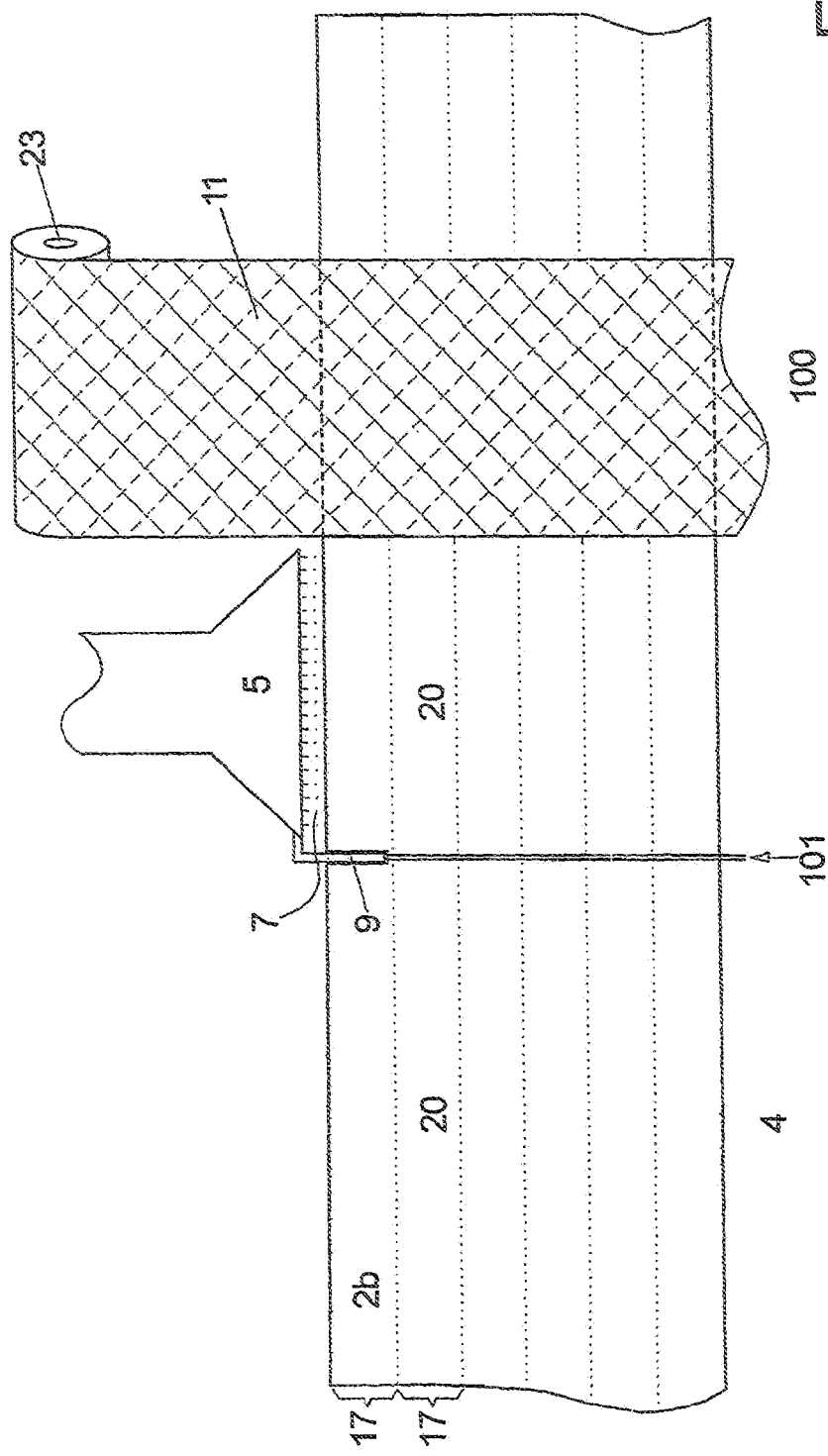

METHOD AND DEVICE FOR LAYERED BUILDUP OF A SHAPED ELEMENT

I. FIELD OF THE INVENTION

Figure 1A:
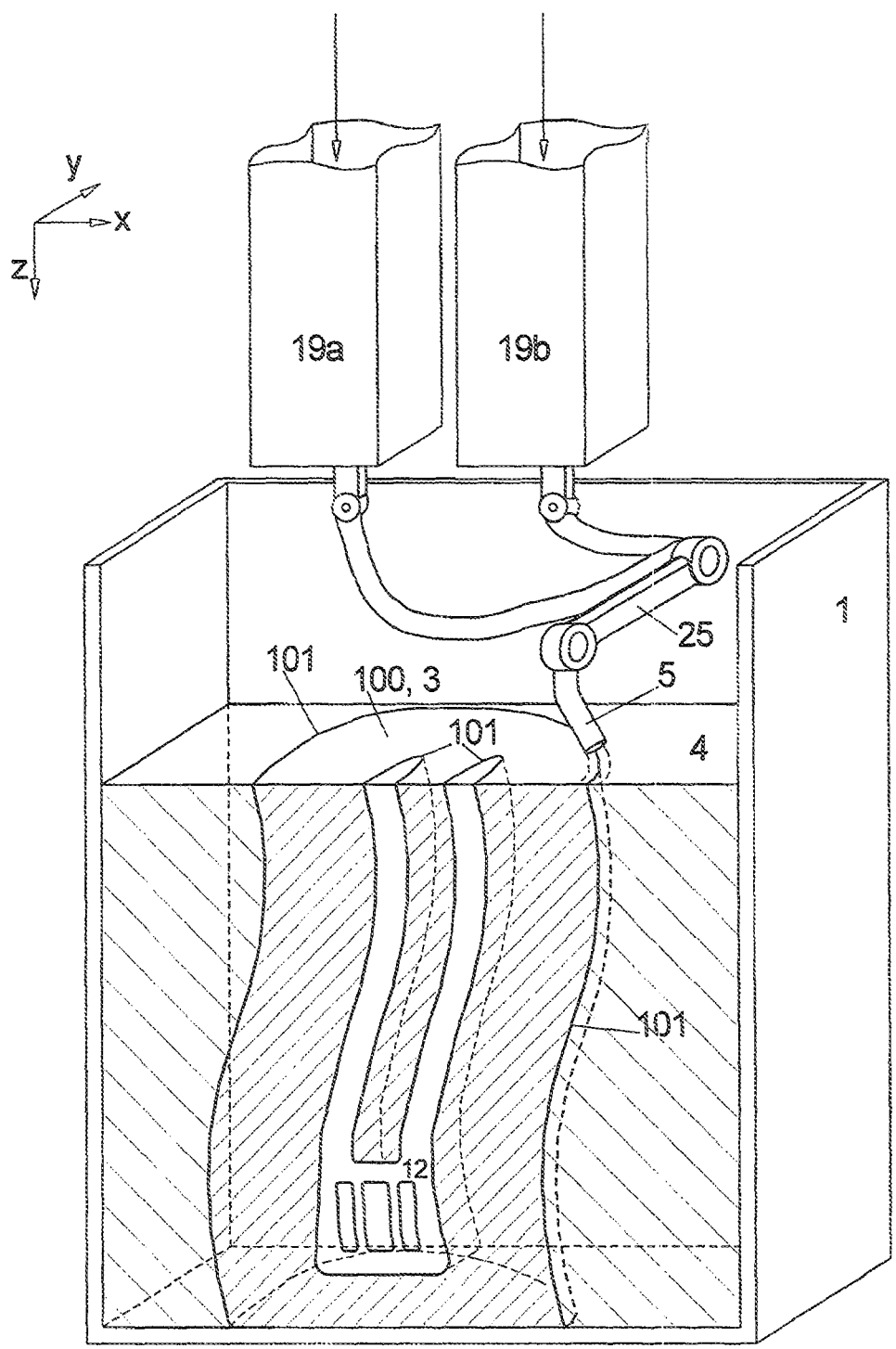

The invention relates to a method for a layered buildup of a shaped element from curing material and to a device for the method.

II. TECHNICAL BACKGROUND

In the past when a shaped elements from a curing material were to be produced, initially a respective negative mold had to be produced into which the typically liquid base material was introduced and in which it could cure.

The complexity for producing a negative mold, however, only pays off when this negative mold is used several times, most advantageously used very many times. Accordingly, producing such shaped elements was expensive since they were produced in small numbers or even as one-offs since no other production method was feasible.

For a couple of years, however, production without negative mold is feasible through so-called prototyping, however, only with particular plastic materials as base materials and only with limited dimensions up to for example 1 m³. There are two different methods which are both performed in a cube shaped container that is not adapted to the shape of the shaped element to be produced.

During so-called 3D printing, a first layer of element material is applied through a controlled nozzle similar to an inkjet printer at the base of the container in a portion of a contour of the shaped element to be produced at this level. The element material cures very quickly so that the next layer can be applied there above immediately thereafter and so forth, wherein the cross-sections of the layers respectively change by a small amount in order to obtain the contour of the shaped element that changes with the elevation.

During so-called selective curing, the element material includes a material which cures very quickly, for example through heat or an applied binder material. This element material is initially applied in one layer over the entire base surface of the container. Subsequently, this powdery layer of element material is only cured in the portion that shall include the shaped element and is for example heated with a focused laser beam or another very limited heat source so that the powdery filling material immediately cures in these portions. Subsequently, another layer of powdery material is placed over the entire surface of the container and the procedure is repeated. After completing the shaped element, it is removed from the container and the surrounding non-cured ambient material is removed from the shaped element by knocking or brushing it off.

For both methods the layer thickness typically is in a range of significantly below mm, for the first method typically at 1/10 mm. Accordingly, sometimes more than ten hours are required for building up a shaped element which has for example a height of 50 cm. Furthermore, suitable materials are expensive so that they are not suited for producing large volume components which in particular must not be excessively expensive. However, there is a whole series of shaped elements which have to be produced at a low price and at a large volume and for which this method was not suitable so far, for example finished components made from concrete, casting molds for metal casting, fiber reinforced plastic materials for custom vehicle construction, in particular marine construction or car body construction and many other applications.

III. DESCRIPTION OF THE INVENTION a) Technical Object

Thus, it is an object of the invention to provide a method of the general type recited supra and a suitable device which are also suitable for producing large volume low price components.

b) Solution

The object is achieved through the features of claims 1 and 14. Advantageous embodiments can be derived from the dependent claims.

By applying the next layer before the layer below or even more layers below are cured, in particular completely cured, the method is extended to a plurality of bonding types and binders which bond relatively slowly compared to the special plastic materials used so far and their type of bonding.

Thus, for example, the same filling materials like in concrete can be used, thus sand, gravel, or a mix, wherein not only concrete is used as a binder, in particular in liquid or pasty form in concrete sludges or concrete paste and furthermore, the entire selection of quickset binders used in concrete construction, for example gypsum or a birder on a concrete base or on a plastic base can be used.

Also wood glue and other binders on a natural base can be used depending on the application of the shaped element to be produced. By the same token, also wood dust can be a suitable filling material. Thus, very cost-effective and large volume materials are available as filling materials and binder materials.

It is a disadvantage that additional measures have to be taken in order to be able to load the lower not yet cured layer with a newly applied layer since the layer is typically not yet sufficiently pressure stable.

A first option that is hardly ever implemented in practical applications is that the sub-layer is not yet completely cured, but in spite of that already pressure stable enough so that the next layer can already be applied there above.

In case this is not yet the case, a second option is to let a support material contact the defining surfaces of the shaped element while it is being built up, thus during its curing time, wherein the support material for example prevents an undesirable deformation of the not yet cured layers.

Thus a differentiation has to be made according to the production method:

During 3D printing, the element material from which the shaped element is produced is applied through a nozzle during 3D printing layer by layer and exclusively in the portion of a shaped element and thus the shaped element is built up.

For the purposes of the present invention, it shall be clarified that the term "nozzle" includes any type of outlet opening, also an outlet opening that may not include the contraction that is typical for a nozzle.

In this method, a respective strand of a material is put out adjacent to another strand through one or plural nozzles, wherein the strands of the not yet cured material contact one another and partially mix and therefore generate a structure in cured condition in which the original individually applied strands are not visible anymore.

Problematic are the portions of the freshly applied layer proximal to the defining surfaces of the formed element, typically of the outer defining surfaces, but when the formed element includes inner cavities, also their inner defining surfaces.

In case the applied element material is sufficiently soft and pasty, it will expand in width without additional measures, in particular when the next applied layer starts to put load on it.

According to the invention, this is counteracted in that support material is arranged on the outside of the defining surfaces, wherein the support material is built up together with the shaped element.

In a preferred embodiment, a strand made from element material is applied along the edge of the current layer of the formed element to be built up and simultaneously, only with little time delay on the outside of the defining surface a strand of support material is applied.

Since it is a typical goal when producing a shaped element to generate a shape with the most precise dimensions possible and furthermore typically also a smooth surface without offsets, the two strands made from element material and support material are applied according to the invention with their extensions preferably directly adjacent to one another, for example with nozzles that are oriented at a slant angle relative to one another, so that the two strands are pressed against one another with the output pressure so that a subsequent additional deformation of the outside of the strand made from element material cannot occur anymore.

For this purpose, the support material should have a specific weight and/or a grain which approximately correspond to the element material or the grain of the support material is smaller than the grain of the element material.

Remote from the defining surfaces, the shaped element on the one hand side and also the support material on the other hand side can either be put out with similar nozzles or with nozzles with greater cross-sections, in particular greater width, in order to perform the surface filling more quickly.

The support material can thus be a material that cures only slightly or not at all. Preferably, however, the material is put out in moist condition. In case it cures, the curing process of the support material should preferably occur quicker than the curing process of the element material or vice versa.

The element to be produced can furthermore include different materials in its interior and the different element materials are introduced by different nozzles within the particular layers. This way, elements can be generated for example which are made from a very hard and stable thin wall exterior material and are less stable, for example insulating inner material or also include cavities in their interiors which are important for the use of the component, for example for installations, as heat exchangers or similar.

The element material can for example vary from the inside out with respect to its grain size, for example by using very fine grain material proximal to the defining surface in order to generate a smooth fine pore defining surface, whereas coarse grain filling material is used further inside the form element, for example in the form of coarse grain additives like for example gravel.

In order to generate a smooth defining surface of the subsequent shaped element without offsets, wherein the individual applied layers are not visible anymore, additional measures can be performed.

For example, a smoothing agent, a quick binder, or similar can be applied directly from the nozzle also separately onto the defining surface of the freshly applied layer of the shaped element or curing the outer surface of the outermost strand is accelerated by applying heat, for example in the form of hot air or in the form of electromagnetic radiation, for example UV radiation in that the element material and/or the support material at least proximal to the defining surfaces includes a material which can be cured very quickly in this manner.

A respective quick binder or smoothing agent can be put out directly through the nozzle for the element material, for example in special additional outlets on the outside of the nozzle, thus at the defining surfaces of the shaped element, also special components can be mixed with the element material through such additional outlets in the nozzle, which components facilitate a quick curing through heat or for example ultraviolet light or other physical or chemical ambient conditions, wherein these ambient conditions should preferably be allowed to impact before the respective outside of the new layer is covered by the support material.

In order to achieve an even better surface and in particular to avoid an adherence or seeping of components of the element material into the support material or vice versa, a release layer made from a release agent can be applied to the defining surfaces at each layer between the support material and the element material, wherein the release agent is preferably applied in turn through a separate vertically standing nozzle. Thus, the release agent will have as little pasty consistency as possible and in particular will not be curing or hardly curing since it shall in particular form a lateral barrier for the outermost strand made from element material immediately after putting it out. For release agents, also very cost-effective materials like silt, clay, wax or similar can be used which can also be reusable later on.

Depending on the speed of the curing process, in particular of the outside of the element material and also running a separation blade along the defining surface, thus between the element material and the support material can be sufficient. The separation blade can also be made from a solid material, for example sheet metal or a flexible material strip like e.g. a piece of foil and can be directly attached at the nozzle. Thus, also a mechanical smoothing effect of the outer surface of the element material is achieved.

Since it is provided in the method according to the invention to also use large shaped elements with dimensions of several meters, the material is put out in layer thicknesses of typically more than 1 mm, better more than 2 mm, better more than 5 mm in order to facilitate a quick buildup.

Since the outer wall of the shaped element is not always precisely orthogonal to the layer plane, the nozzles which in particular generate the outer strand and thus the defining surface of the shaped element are preferably pivotable about their longitudinal axis in adaptation to the current orientation of the shaped element with respect to the layer to be produced. The nozzle then preferably includes at least one flat side surface. Preferably the nozzle has a rectangular cross-section and thus can be adjusted for this layer with one of its lateral surfaces parallel to the orientation of the defining surface.

Another method includes selectively curing a continuous material layer.

Thus, the element material includes at least two components, namely a filling material like e.g. sand, saw dust, gravel or similar and a binder for example concrete sludges. Thus, initially a filling material layer is applied layer by layer over the entire container in which the shaped element is generated and then a binder is put out in the portions of the shaped element to be produced, namely a liquid binder is applied to the filling material layer, wherein the liquid binder permeates the filling material, drenches it, and generates a curable mix.

In order to produce a clean defining surface of the shaped element, either the described release layer made from a release agent can be introduced at the boundary between the shaped element and the surrounding support material before or during applying the binder in the edge portion of the shaped element or the defined separation blade can be run along this boundary, under some conditions also both in combination.

A separation blade of this type can also be heated and cure the element material sliding along through the heat of the separation blade or the separation blade can include outlet openings for chemicals or for generating a particular physical condition in its environment, for example it can emit UV light in order to cure a respective selected binder at the defining surface of the shaped element while the separation blade slides along.

The intermediary space generated by the separation blade between the support material and the element material is closed at the latest through applying the next layers and their weight loading, but can also be achieved before by respective guide plates for example attached at the separation blade which cause a movement of support material in a direction toward the shaped element in the support material.

It is another option to apply water outside of the defining surface onto the filling material or optionally also onto the quick binder which shall then cure as quickly as possible but only to a slight extent. Wetting the filling material outside the shaped element has the purpose that no moisture gradient is generated at the defining surface, wherein the moisture gradient could cause an outward seeping for example of the concrete sludges or the applied partially liquid binder in outward direction into the support material.

Independently from the buildup method used, this type of production of large volume components, in particular concrete components, has additional advantages.

In particular cavities can be produced in the shaped element, wherein the cavities either remain empty or are filled with a different material during buildup. These cavities can also have a complicated undercut shape that would not be producible through conventional mold based production methods.

Another advantage lies in the simple manner in which reinforcements can be introduced, wherein there is no limitation to steel reinforcements like in conventional concrete construction, but in particular reinforcements from flexible fibers like glass, plastic or carbon are suitable which can be provided in strand shape or as linked woven materials.

These flexible reinforcements on the one hand side adapt to any desired shape of the shaped element, but they can in particular be introduced in a simple manner from a wound storage roll into the shaped element during layer buildup.

A reinforcement dispenser of this type with a storage roll or plural storage rolls can thus be carried along either at the nozzles or the supports for the nozzles or can be supplied separately. Thus, in particular a fabric, for example in strips, can be introduced into the shaped element, wherein the orientation of the strips parallel to the plane of the layers to be applied can also extend perpendicular thereto.

For a perpendicular orientation, the strip shaped reinforcements like the nozzle can be placed parallel to the defining surfaces of the shaped element. However, it is another option to attach such strip shaped or strand shaped reinforcement with one end at the base of the container, thus at the lower end of the shaped element and thus to increasingly wind them in upward direction with the configuration of the shaped element which in no way has to be performed in a straight direction but can follow this contour for a curved outer contour.

As a device for performing these methods, initially a container is required in which the shaped element can be built up starting at the container base. For later simplified removal of the finished shaped element, the container can include for example one or plural walls that can be folded down or the container can be configured tiltable or it can be configured open on top.

Thus it would also be advantageous for the base of the container to be elevation adjustable relative to the walls so that the container base is arranged high at the beginning of the buildup of the container base and is then respectively lowered by the thickness of one layer. The entire movability in the vertical would then be implemented primarily by the container base which would highly simplify the configuration of the devices and nozzles applying the materials.

Additionally at least one storage container for the material is required depending on the method used and at least one nozzle which is movable in a controlled manner in the horizontal Z-plane and also in the Z-direction. Furthermore, a control is required which controls the entire method sequence.

Thus it is irrelevant whether the nozzle is attached at a horizontally movable X-slide which is in turn attached at a horizontally movable Y-slide as it is known for example is from printers and both are jointly adjustable in elevation, thus in Z-direction or instead the respective nozzle is attached at a robotic arm and thus freely movable in space at least within the container, preferably also movable outside of the container, in particular to facilitate a subsequent simple extraction of the shaped element or to perform a tool change or a nozzle change.

When using the first described method that is very close to 3D printing, at least two storage containers and associated therewith at least one nozzle are required, wherein support material is in one storage container and element material is in the other storage container.

One of the nozzles for applying the edge side strands, in particular the nozzle for putting out the element material, can include a heater or outlet openings for a wetting agent at its outlet and/or a quick binder and/or hot air and/or electromagnetic radiation for quicker curing of the defining surface of the mold element.

For the second method of selective curing, also two storage containers are required, one for the filler material and one for the binder. In the extreme, only one nozzle is required for putting out the binder, while the layer application of the filling material can also be performed in another manner, for example pouring and scraping with a scraper. A slot nozzle can be used for application which extends over the entire length or width of the container.

Independently from the type of buildup method, the device can include one or plural reinforcement dispensers. In flexible reinforcements like strands or fabric bands made from plastic material, glass, carbon or similar flexible materials, these can be kept wound on a storage roller in a simple manner, wherein they are increasingly wound off from the storage roller. These reinforcements can be placed in the plane of the respective buildup layer, parallel and also perpendicular to the main plane of the layer or they can also extend through all layers with their main extension perpendicular to the layer plane with increasing layer buildup.

Also conventional reinforcements made from construction steel are feasible and can be introduced for example through a robotic arm piece by piece during layer buildup and can be welded together with the already existing reinforcements through the robot.

Additionally, heat radiators, ultraviolet radiators or outlet openings for hot air or chemicals can be provided, either directly at the nozzle or at a separate device that is movable in a controlled manner, for example a separate robotic arm.

Furthermore, the device can include a special release agent nozzle through which a release agent is applied to the defining surface between the support material and the element material. The release agent nozzle can be an element of one of the other nozzles or a separately run nozzle.

The device can furthermore include a separation blade which is made from rigid or flexible material and which is also pulled along the defining surface during or shortly after applying the edge side strand of the shaped element. The separation blade can be heated and/or can also include outlet openings for chemicals, hot air, ultraviolet radiation or similar, which are used for smoothing and/or quickly solidifying the defining surface of the shaped element.

c) EMBODIMENTS

Figure 1C:
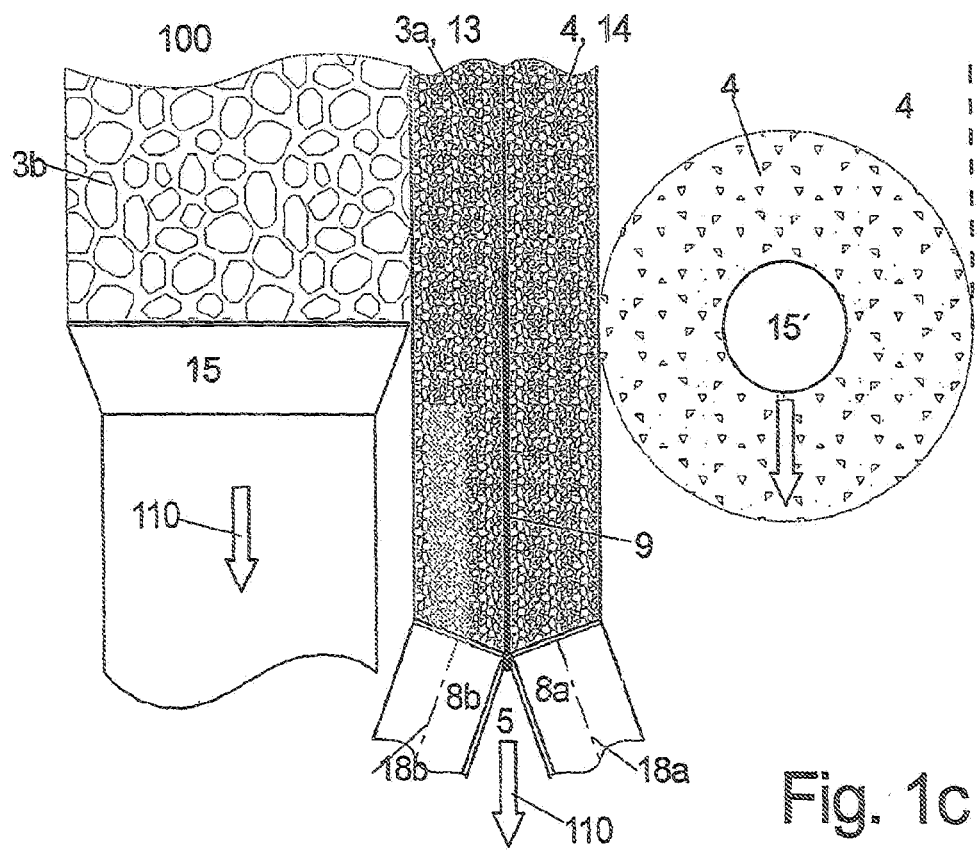
Figure 2A:
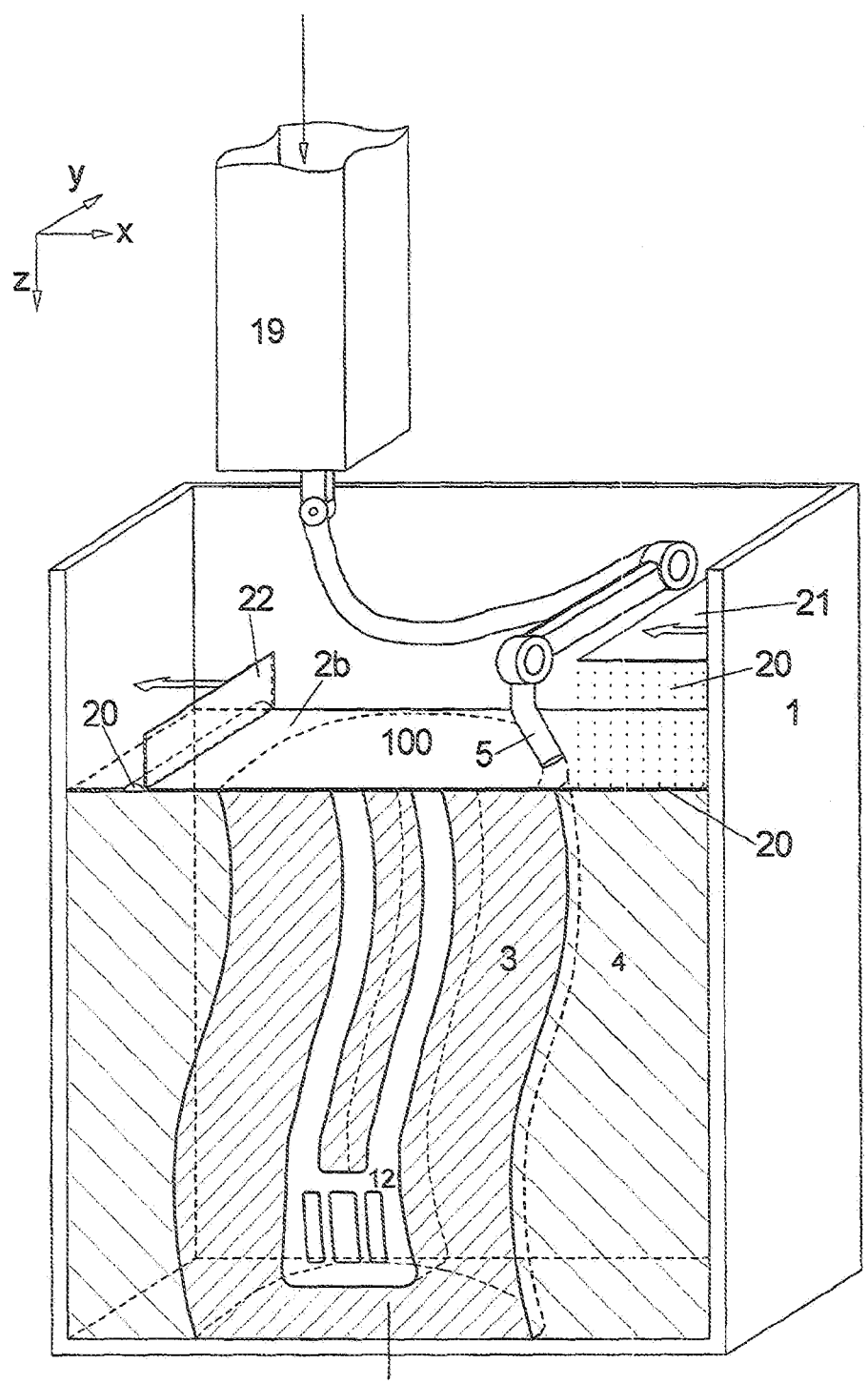
Figure 2C:
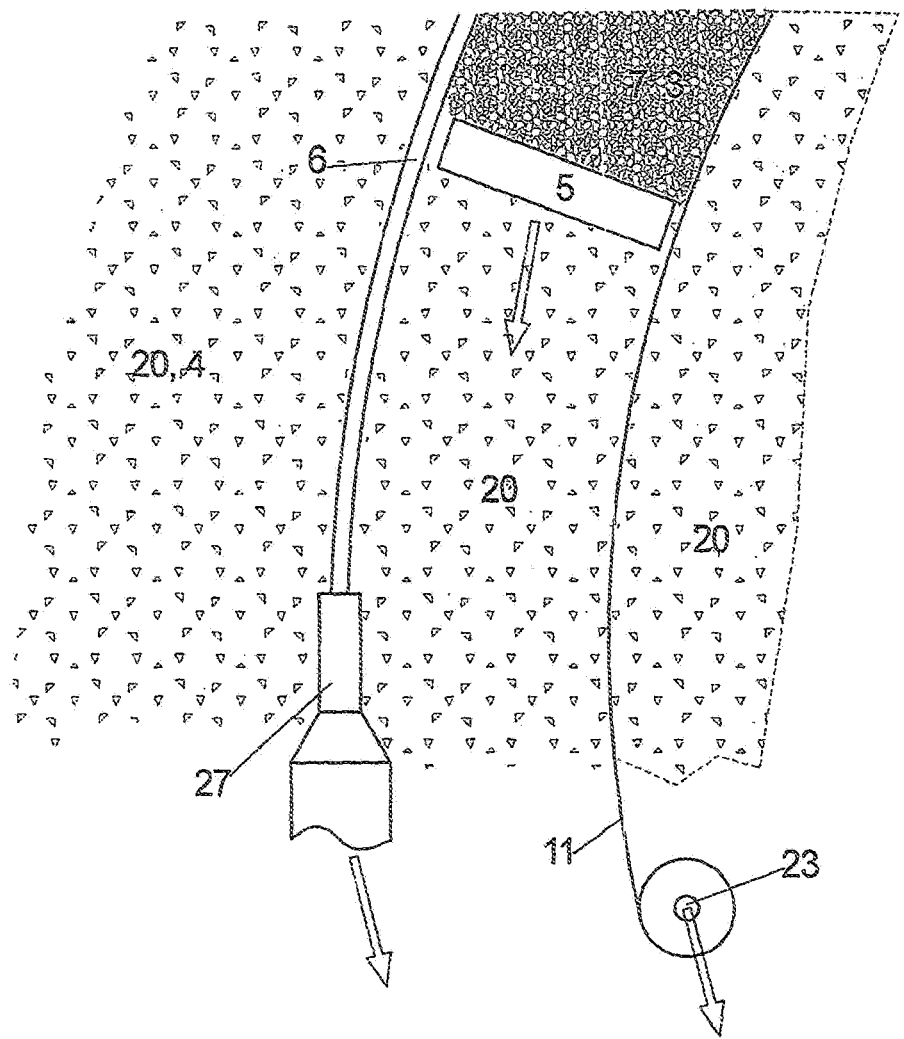

Embodiments of the invention are subsequently described in more detail in an exemplary manner, wherein:

FIG. 1a illustrates a first embodiment of the invention;
FIG. 1b illustrates a detail sectional view of FIG. 1a;
FIG. 1c, d illustrate details of FIG. 1a in top view;
FIG. 2a illustrates a second embodiment according to the invention;
FIG. 2b illustrates a detail sectional view of FIG. 2a; and
FIG. 2c illustrates a detail top view of FIG. 2a FIG. 1a illustrates the device for the first method according to the invention in a vertical sectional view.

Thus, a shaped element 100 is built up in an open container 1 from bottom to top, thus starting at the base of the container 1 from layers 2a, b, c horizontally arranged on top of one another in that element material 3 is applied in layers for forming the desired shaped element 100 and also by applying support material 4 from at least one nozzle 5 about the shaped element 100, wherein the nozzle 5 is movable in a controlled manner about the horizontal surface in an interior of the container 1 and is connected with storage containers 19a, b from which materials 3 and 4 are supplied which exit from the nozzle 5.

An enlarged representation in a vertical sectional view is provided in FIG. 1b in which the shaped element 100 made from element material 3 is produced on a left side of the defining surface 101, wherein the container is filled with support material 4 on a right side.

The support material 4 about the desired shaped element 100 is required so that the material 3 or 3a of the shaped element does not extend laterally beyond the desired reference surface 101 until it is completely cured.

This risk is naturally the highest for the strand 13 that is freshly applied along the edge of the shaped element. Therefore, a strand made from support material 4 is applied on an outside of the defining surface 101, thus adjacent to the strand 13, preferably simultaneously, wherein the support material has approximately the same specific weight as the element material 3 and preferably also has the same grain size as the element material 3 in an edge portion.

For this purpose, the nozzle 5 preferably has two outlet openings 8a, b and respective supply lines for the materials 3a, 4 and a planar outside 5a at least at the opposite defining surface in order to generate a flat defining surface 101.

As apparent in FIG. 1a, the nozzle 5 is run in a horizontal plane along an entire circumference of the shaped element 100 to be generated. The portions of the shaped element 100 that are less critical since they are further remote from the defining surface 101 and also the portions of the support material 4 in this plane can fill this layer thickness 17 through other nozzles 15 which are for example wider.

Thus, it is illustrated in FIG. 1b that a different element material 3b that is for example coarser can be put out for this purpose further in an interior of the shaped element 100 through the nozzle 15, wherein the element material cannot be optically detected later on at the finished shaped element 100. Preferably, the nozzles 15 are recessed relative to the nozzle 5 in advancement direction 110.

This does not only apply for the outer reference surfaces 101 of the shaped element 100, but also for possibly internally located reference surfaces 101 should the shaped element 100 include cavities 12. Preferably then also the inner defining surfaces 100 are traced by the nozzle 5.

Instead of the cavities 12, also portions from another element material can be generated in an interior of the shaped element 100, wherein an additional nozzle 5 or an additional outlet opening at the nozzle 5 is required for these additional materials for this additional element material.

Preferably the particular outlet openings of a nozzle 5 can be separately controlled anyhow, thus opened or closed through the control of the device which also controls the movements of the nozzles.

FIG. 1a illustrates that this layered configuration also facilitates producing cavities 12 with complicated shapes which cannot be produced through classic mold based production methods.

The nozzle 5 starts applying the next layer, when the layer arranged thereunder is completed over the entire surface of the container 1 or at least the filling adjacent to the edge side strands 13, 14 from the nozzle 5, for example through the wider nozzles 15, is provided so that the loading through applying a new strand 13, 14 is feasible.

As illustrated in FIG. 1c, the nozzles 15 for the material remote from the edge portions of the shaped element 100 and of the support material 4 can either be wider nozzles or also as illustrated in the portion of the support material 4 it can be a vertically downward oriented open tube outlet which generates an accordingly wide pouring cone and moves a respective track slightly to the rear through forward movement in advancement direction 101 together with the nozzle 5 or relative to the nozzle 5 in advancement direction.

One of the problems of such production of a shaped element 100 is obtaining a smooth, optically appealing defining surface 110 and avoiding too strong adherence of the support material 4 at the defining surface 101 of the finished shaped element 100.

For this purpose, plural measures can be performed individually or supplementing each other.

Figure 1D:
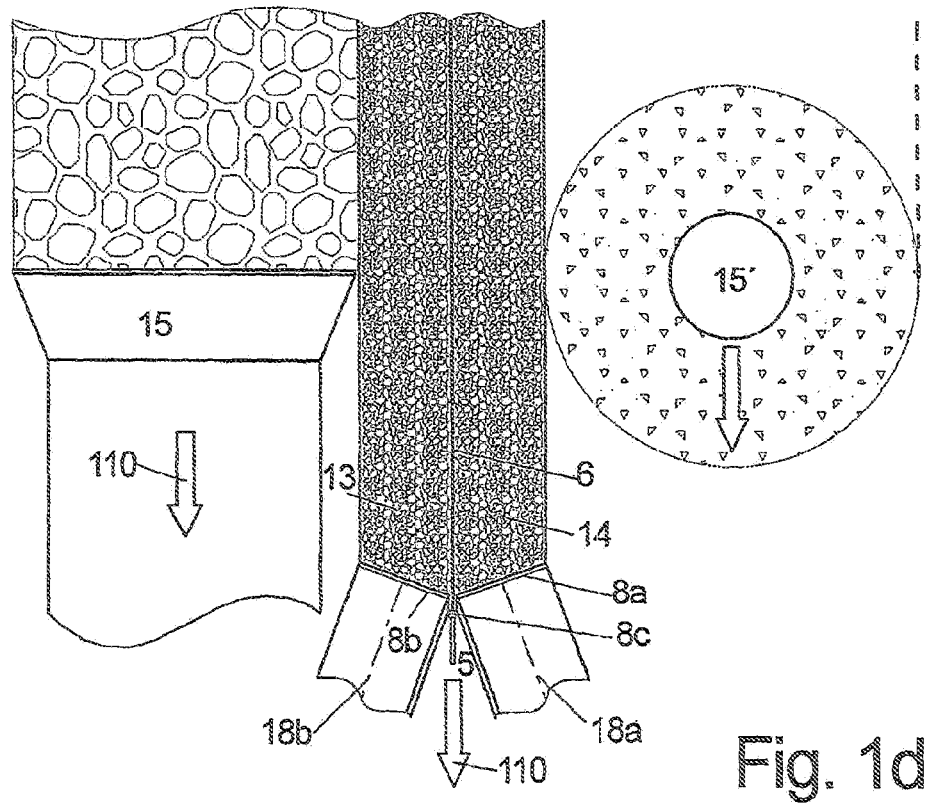

As illustrated in FIGS. 1c and 1d, the edge side strands 13, 14 made from element material 3 or 3a and support material 4 on the other hand side are moved close to one another and even pressed against one another in that the outlet openings 18a, b of the outlets 8a, b of the nozzle 5 for the two materials are placed at a slant angle to the advancement direction 110 so that they are oriented slightly against one another.

As a supplemental measure, a separation blade 9 which is preferably made from flexible material, e.g. like a foil strip, and attached at the nozzle 5 can be pulled along when putting out the two strands 13, 14, so that the two strands 13, 14 only come in direct contact with one another sometime after exiting from the nozzle 5 and so that in particular the strand 13 made from element material 3 or 3a is already cured up to this point in time, at least at its outside oriented towards the strand 15.

This can be achieved on the one hand side in that element material 3a which exits at the nozzle 5 and forms the edge side strand 13 is mixed with another quickly curing hardener which cures quicker than the hardener added to the element material 3b in the interior of the element. This can be furthermore improved in that for example as visible in FIG. 1b, outlets 26 are provided in the inner surface of the outside of the outlet opening 8b of the nozzle 5, wherein either hot air is introduced through the outlets in this portion for quicker curing of the strand 13 or an additional quick binder wets the outside of the strand 13 in order to cause its quick curing.

FIG. 1d illustrates that instead of the separation blade 9, also a layer made from a release agent and standing vertically between the two strands 13, 14 can be put out through a separate outlet opening 8c at the nozzle 5 between the outlet openings 18a and 18b.

FIG. 1b furthermore illustrates a first option how a reinforcement 11 in the form of in this case a flexible strip, for example made from a fiber material or plural fiber strands, can be worked into the shaped element 100, in this case at the transition between the edge side strand 13 from a first element material 3a and the possibly coarser element material 3b arranged further inside.

For this purpose, the flexible reinforcement 11 is wound onto a reinforcement dispenser 23 configured as a storage roll which can be fixated for example at the nozzle 5 and the strip shaped reinforcement 11 is applied to the inner element side of the edge side strand 13 through winding during application of the strands 13, 14 and is then arranged running parallel to the outer reference surface 101 of the subsequent shaped element 100. With respect to height, the reinforcements 11 supplement one another but they can also have a width that slightly protrudes beyond the respectively applied layer and can this way contact one another in elevation direction, thus the Z-direction and can form a continuous reinforcement.

FIGS. 2a-2b are used for describing a second method.

Thus, the element material from which the shaped element 100 shall be generated is made from two components, namely a filling material 20 and a binder 7 hardening the filling material 20. The filling material 20 simultaneously forms the support material 4, wherein the support material 4 can be drenched as a support material without binder or with another possibly more quickly or more easily curing binder.

For this purpose, a new layer 2b made from filling material 20 is continuously applied over the entire inner surface of the container 1 in that for example the filling material 20 is applied flat in the container through a slot nozzle 21 which extends over the entire length or width of the container and is moved transversal thereto and which is advantageously subsequently applied with a scraping tool to a defined layer elevation 17.

This way, not only the portions about the shaped element 100 but also cavities 12 that possibly have to be introduced into the shaped element 100 are initially completely filled with filling material which then after completing, the shaped element 100 does not only have to be removed from its outer surfaces but also from its cavities 12 which however should not cause any problems for a loose filling material that is configured as a support material 4, at least with additional support through flushing, for example with water or compressed air.

The second method also renders it more complicated that different materials are used in the shaped element since the same filling material 20 is always provided.

Subsequently as is better visible in FIG. 2b, only the binder 7 is supplied, typically with a nozzle 5, typically in liquid form or as a sludge from the storage container 19 and is put out only in the portion of the shaped element 100 on the filling material 20 and thus the shaped element 100 is cured in its uppermost layer 2b.

Thus, the method preferably starts with the edge portion of the shaped element 100 proximal to its defining surface 101, however, simultaneously or subsequently, also the entire remaining cross-sectional surfaces of the shaped element 100 are wetted with binder 7.

Thus the layer thickness 17 compared to the amount of binder 7 applied per surface unit and its liquidity has to be selected so that the binder 7 can reliably permeate the entire layer thickness 17 of the last filling material layer 20.

In order to obtain a clean defining surface 101, also here auxiliary measures can be performed, for example a separation blade 9, for example attached at the nozzle 5, can be attached for defining the edge portion, wherein the separation blade 9 penetrates beyond the layer thickness 17 of this last layer and prevents binders 7 from seeping into the portion outside the shaped element 100.

Instead of the separation blade 9, a layer made from release agent 6 can be applied according to FIG. 2c through a separate nozzle 27 which reliably prevents the above seepage. Thus, the release agent 6 has to be selected so that it can be easily removed from the outer surface of the shaped element 100 after its completion.

FIG. 2b furthermore illustrates another option of introducing a reinforcement 11, thus also herein provided as a fabric strip that is pulled off from a supply roller configured as a reinforcement dispenser 23.

Thus, the reinforcement, either configured as a fabric strip or particular strands arranged adjacent to one another is arranged vertically and for example was originally attached at the base of the container 1 and is pulled in upward direction with the layer configuration.

This reinforcement 11 always protruding beyond the uppermost layer naturally forms an obstacle when applying the next layer and has to be considered in that, for example, the slot nozzle 21 and/or the scraper 22 are moved in such direction and are configured and possibly divided so that they run past the reinforcement 11.

REFERENCE NUMERALS AND DESIGNATIONS 1 container
2a, b layer
3, 3a, b element material
4 support material
5 nozzle
5' longitudinal extension
5a outside
6 release agent
7 binder
8a, b outlet
9 separation blade
10 main plane
11 reinforcement
12 cavity
13 strand
14 strand
15 nozzle 16 layer
17 layer thickness
18 outlet directions
19a, b storage container
20 filling material
21 slot nozzle
22 scraper
23 reinforcement dispenser
24 air nozzle
25 robotic arm
26 outlet
27 nozzle
100 shaped element
101 reference surfaces
110 feed direction

The invention claimed is:

1. A method for layered buildup, which comprises:
building up layers of a shaped element (100) from liquid or pasty curing material in a container (1), wherein the next layer (2b) is applied before at least the layer (2a) thereunder is cured, characterized in that
a strand (13) made from an element material (3) is simultaneously placed adjacent to a strand (14) made from a support material (4) for forming defining surfaces (101) of the shaped element, so that a subsequent additional deformation of the outside of the strand made from element material cannot occur anymore; and
the element material (3) and the support material (4) are applied in layer thicknesses (17) of more than 2 mm.

2. The method according to claim 1, wherein the buildup is performed by applying the element material (3) from at least one supported nozzle, and the support material (4) is applied in layers, simultaneously about the shaped element (100) from a nozzle (5), wherein the support material has the same specific weight and/or the same granularity as the element material (3).

3. The method according to claim 2,
wherein the support material (4) cures to a lesser extent than the element material (3), however when it cures, it cures quicker than the element material (3), and/or
wherein the support material is applied moist, so that no moisture gradient is generated at the defining surface.

4. The method according to claim 2, wherein different materials (3a, b) are used as the element material (3), an interior of the shaped element (100) includes said different materials (3a, b) or a pressure stable material (3a) is used for the outer walls of the shaped element (100) and a less pressure stable, insulating material (3b) is used for the interior of the shaped element (100).

5. The method according to claim 1, wherein curing an edge with heat and/or ultraviolet light is accelerated either at the edge of the support material (4) and/or the edge of the shaped element (100) in respect to another edge.

6. The method according to claim 1,
wherein a reinforcement is introduced when applying layers which reinforcement includes wound off fiber strands or fabric bands or individual metal elements, and/or
wherein cavities (12) are integrated when building up the shaped element.

* * * * *